A. BLAKE.
NUT LOCK.
APPLICATION FILED OCT. 10, 1919.
1,349,404.  Patented Aug. 10, 1920.
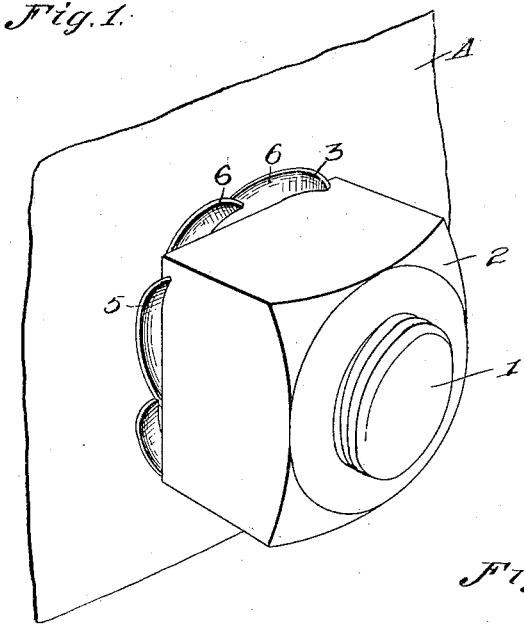
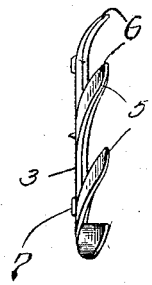
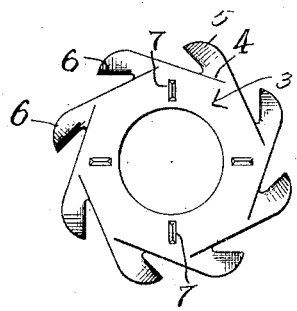
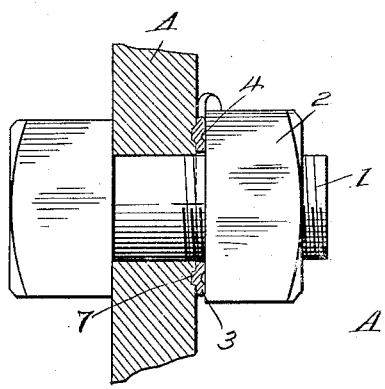
Inventor
A. Blake.
By Geo. P. Kimmel.
Attorney

UNITED STATES PATENT OFFICE.

ARCHIE BLAKE, OF NEW ORLEANS, LOUISIANA.

NUT-LOCK.

1,349,404. Specification of Letters Patent. Patented Aug. 10, 1920.

Application filed October 10, 1919. Serial No. 329,824.

*To all whom it may concern:*

Be it known that I, ARCHIE BLAKE, a citizen of the United States, residing at New Orleans, in the parish of Orleans and State of Louisiana, have invented certain new and useful Improvements in Nut-Locks, of which the following is a specification.

My invention relates to improvements in nut locks, and more particularly to that class of nut locks wherein a spring washer is used for holding the nut in its locked position.

The primary object of my invention is to provide a nut lock adaptable for use with a bolt and nut of the conventional type, it being only necessary to interpose between the nut and the object to be bolted the washer which comprises the particular feature of my invention.

Still further objects of the invention are to provide a nut lock of such construction that inclement weather, and wear will have a minimum effect, this being accomplished by the simple yet unique construction of the washer.

Other objects of this invention not at this time more particularly enumerated will be clearly understood from a detailed description and drawing forming a part of this specification.

Furthermore this invention consists in the novel arrangement and combination of parts more particularly described in the following specification and embodied in the claims hereunto appended and forming part of this application.

Referring to the drawings:—

Figure 1 is a perspective view showing the washer applied and the nut in its holding position.

Fig. 2 is a perspective view of the washer.

Fig. 3 is a sectional side view of a nut and bolt having my improved washer mounted thereon.

Fig. 4 is a plan view of the washer.

In the accompanying drawing wherein like characters of reference indicate like or similar parts throughout the several views, A indicates the object to be bolted, extending through which is a bolt 1 and the usual form of nut 2.

Referring particularly to Fig. 3 wherein is illustrated in detail my washer generally designated by 3 it will be seen that a series of fingers 6 are formed thereon which extend upon a line tangent to a circle which is concentric with the bolt hole. These fingers, and in fact the entire material forming the washer, are of spring metal; the entire washer being normally bent slightly concave to cause the fingers to stand outwardly and upwardly to engage, as is clearly shown in Fig. 1, the corners of the superposed nut upon its being screwed down tight upon the object to be bolted. The upper edges of the fingers are beveled as is clearly shown and the points bent slightly more upwardly than the rest of the fingers. Extending on a line with the inner edge of each of the fingers and also tangent to a circle which is concentric with the bolt hole is an inclined groove 4 which materially increases the spring action of the fingers. The lower outer edge 5 of the fingers is not beveled but the body portion of the upper part of the fingers is beveled downwardly to form a substantially knife edge. Adjacent the bolt hole and extending radially thereto are a series of depending engaging lugs 7 for gripping the object to be bolted to prevent movement of the washer relative thereto upon screwing the nut tight thereupon.

Particular attention is called to the spring action of the fingers and of the beveled edges and groove as is clearly illustrated by the shading in Fig. 3, as increasing the advantages derived from this construction upon which applicant relies.

In operation the bolt is placed through the material to be bolted with the washer placed on the bolt between the material and the nut 2. Upon screwing the nut down tight thereupon the fingers 6 frictionally engage the under surface of the nut and several of the fingers extend outwardly toward and engage the sides of the nut as is clearly shown in Fig. 1 of the drawing thereby securely holding the nut against accidental displacement. These fingers being arranged tangentially operate similar to a ratchet permitting the nut to be turned in locking direction and holding it against turning in the opposite direction.

Manifestly, the construction herein described and illustrated may be varied to a material extent, and therefore, such modifications as are within the scope of the appended claims, I consider within the spirit of my invention.

What I claim is:

1. A concavo-convex nut washer having a bolt hole and peripherally arranged fingers, said fingers extending tangentially to a circle concentric with the bolt hole, the ends of the fingers being curved laterally toward the concave face of the washer.

2. A concavo-convex nut locking washer having a bolt hole and peripherally arranged fingers extending tangentially to a circle concentric with the bolt hole, the ends of the fingers being curved laterally toward the concave face of the washer and tangentially disposed grooves at the bases of said fingers on both faces of the washer.

In testimony whereof I affix my signature hereto.

ARCHIE BLAKE.